United States Patent

Zbikowski et al.

[11] 4,050,434
[45] Sept. 27, 1977

[54] HYDRAULIC SERVO-MOTOR

[75] Inventors: Gerhard Zbikowski, Friedrichshafen; Salahaddin Geafer, Markdorf, both of Germany

[73] Assignee: Motoren- und Turbinen-Union Friedrichshafen GmbH, Germany

[21] Appl. No.: 582,688

[22] Filed: June 2, 1975

[30] Foreign Application Priority Data

June 22, 1974 Germany .............................. 2430044

[51] Int. Cl.² .............................................. F02D 1/06
[52] U.S. Cl. .................... 123/140 FG; 91/366; 91/378; 91/391 R; 123/139 ST
[58] Field of Search ......... 123/140 R, 139 ST, 140 A, 123/140 FP, 140 FG, 179 L; 91/366, 378, 391 R

[56] References Cited

U.S. PATENT DOCUMENTS

| 2,602,655 | 7/1952 | Gesner | 123/140 FG |
| 2,619,075 | 11/1952 | Holloway | 91/391 R X |
| 2,868,184 | 1/1959 | Moulton | 123/140 FG |
| 2,879,754 | 3/1959 | Von Kienlin et al. | 123/139 ST |
| 3,499,426 | 3/1970 | Bailey | 123/140 R |

FOREIGN PATENT DOCUMENTS 1,072,101  12/1959  Germany ...................... 123/140 FG Primary Examiner—Carroll B. Dority, Jr.
Assistant Examiner—Tony M. Argenbright
Attorney, Agent, or Firm—Craig & Antonelli

[57] ABSTRACT

A hydraulic servo-motor for the control of an internal combustion engine which is equipped with a servo-piston, with a fuel quantity control mechanism and with a control slide valve member arranged coaxially to the servo-piston which itself is in operative connection with a centrifugal governor; a working medium under pressure is supplied by a pump driven directly or indirectly by the internal combustion engine; an auxiliary piston arranged coaxially to the servo-piston and to the control slide valve member is acted upon by the pressure of the working medium and permits in case of an existing pressure of the working medium, a stroke of the control slide valve member in one direction which is limited by the servo-piston and a stroke of the control piston in the other direction which is limited by the auxiliary piston; a spring supported at the servo-piston acts on the auxiliary piston opposite the pressure of the working medium and clamps together the control slide valve member and the servo-piston in case of absence of pressure in the working medium.

16 Claims, 3 Drawing Figures

HYDRAULIC SERVO-MOTOR

The present invention relates to a hydraulic servo-motor for the control of an internal combustion engine with a servo-piston which is connected with a fuel quantity control mechanism of the internal combustion engine, with a control slide valve member coaxially arranged to the servo-piston which is operatively connected with the measuring mechanism of a centrifugal governor of the internal combustion engine, and with a working medium whose pressure is produced by a pump driven by the internal combustion engine.

It is the aim of the present invention to enable a direct control without the reinforcing effect of the servo-motor during the starting of the engine, when the pressure of the working medium of the servo-motor is not yet present, or in case failure of this pressure as a result of a defect during the operation of the internal combustion engine, whereby a more unfavorable control behavior of the entire control circuit can be accepted.

Control mechanisms are known in the art (German Pat. No. 931,618 and German Pat. No. 1,933,914) which carry out such a function. In these prior art installations, the controller and the servo-motor are arranged separate from one another, and the connection between the centrifugal governor and the fuel quantity control mechanism takes place by way of a complicated linkage. Even though it is achieved thereby that the servo-piston need not be displaced during operation without pressure of the working medium by the adjusting forces of the centrifugal governor, the control system is unfavorably influenced also during the far more important and more frequently occurring operation with the servo-motor as regards its accuracy by the different levers with their idle strokes or lost motions and pivot points as well as by the necessary spring elements, because the linkages and the springs are arranged necessarily ahead of the servo-motor in the path of control flow.

Furthermore, a control installation with a servo-motor for an internal combustion engine is known (German Pat. No. 564,019) in which the control slide valve member includes an abutment in order to effect a shutting down or turning off of the internal combustion engine in case of failure of the fluid pressure in the servo-motor. A starting of the internal combustion engine without pressure in the servo-motor and an emergency operation, however, are not possible therewith.

Accordingly, it is the aim of the present invention to provide an installation which permits the starting and the emergency operation of an internal combustion engine having a controller and a servo-motor without pressure of the working medium in the servo-motor, which, however, does not impair in any manner the normal operation with pressure of the working medium.

The underlying problems are solved according to the present inventon by a hydraulic servo-motor for the control of an internal combustion engine with a servo-piston which is operatively connected with a fuel quantity control mechanism of the internal combustion engine, with a control slide valve member arranged coaxially to the servo-piston which is operatively connected with the mesuring unit of a centrifugal governor of the internal combustion engine, and with a working medium whose pressure is produced by a pump driven directly or indirectly by the internal combustion engine, in that an auxiliary piston is provided coaxially to the servo-piston, and to the control slide valve member which is acted upon by the pressure of the working medium, while the control slide valve member is provided with an abutment which permits a stroke of the control slide valve member limited by the servo-piston in the one direction, and a stroke of the control piston limited by the auxiliary piston in the other direction, when pressure is present in the working medium, and a spring which is supported at the servo-piston, acts on the auxiliary piston opposite the pressure of the working medium and clamps together the control slide valve member and the servo-piston by way of the abutment and the auxiliary piston when no pressure exists in the working medium.

In one advantageous embodiment of the present invention, the auxiliary piston is slidingly sealingly guided with respect to the servo-piston and the servo-motor housing whereas in another embodiment the auxiliary piston is slidingly sealingly guided with respect to the servo-piston and the control slide valve member.

An additional device for matching the adjusted intended rotational speed during operation without pressure of the working medium is realized according to the present invention in that an adjustable spring engages at the control linkage between the servo-motor and the fuel quantity control mechanism which acts as additional spring in addition to the control spring, when the pressure is absent in the working medium.

Accordingly, it is an object of the present invention to provide a hydraulic servo-motor which avoids by simple means the aforementioned shortcomings and drawbacks encountered in the prior art.

Another object of the present invention resides in a hydraulic servo-motor which enables also a direct control without the effect of the servo-motor during the starting of the internal combustion engine when the pressure of the working medium of the servo-motor is not yet present, or in case of absence of this pressure as a result of a defect during the operation of the internal combustion engine.

A further object of the present invention resides in a hydraulic servo-motor operatively connected with the fuel quantity control mechanism of an internal combustion engine which facilitates the starting of the engine and enables the continued operation thereof even in case of a failure in the hydraulic system causing pressure loss.

A still further object of the present invention resides in a hydraulic servo-motor which not only achieves all of the aforementioned aims and objects by extremely simple means but additionally ensures a relatively highly accurate operation thereof.

Another object of the present invention resides in a hydraulic servo-motor of the type described above which permits a starting of the engine without pressure in the servo-motor and an emergency operation if the pressure is lost during the operation of the engine.

A further object of the present invention resides in a hydraulic servo-motor of the type described above which offers effective starting and emergency assists, yet does not impair in any manner the normal operation of the servo-motor with pressure of the working medium.

These and further objects, features and advantages of the present invention will become more apparent from the following description when taken in connection with the accompanying drawing which shows, for purposes of illustration only, two embodiments in accordance with the present invention, and wherein.

Figure 1:
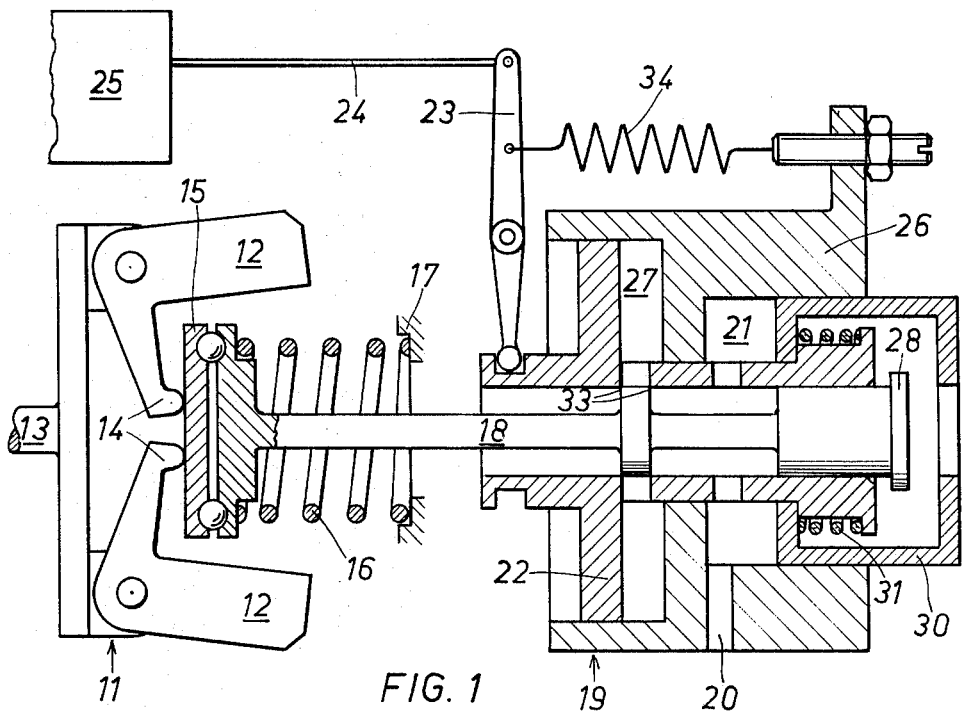
FIG. 1 is a somewhat schematic view of a centrifugal governor for an internal combustion engine with a servo-motor in accordance with the present invention, which is illustrated with the working medium under pressure.

Referring now to the drawing wherein like reference numerals are used throughout the various views to designate like parts, the centrifugal governor generally designed by reference numeral 11 consists in the illustrated embodiment of flyweights 12 which are driven from an interanl combustion engine, (not shown) by way of the shaft 13 at a speed proportional to the rotational speed of the internal combustion engine. The centrifugal force of the flyweights 12 acts by way of levers 14 on a sleeve 15. A control spring 16 also acts on the sleeve 15, whose prestress can be adjusted by changing the position of a spring abutment 17. The position of the sleeve 15 is thus dependent on the force of the control spring 16 and on the centrifugal force of the flyweights 12, i.e., on the adjusted prestress of the control spring 16 and on the rotational speed of the internal combustion engine. A control slide valve member 18 of a servo-motor generally designated by reference numeral 19 is operatively connected with the sleeve 15 of the centrifugal governor 11. This control slide valve member 18 controls the working medium, whose pressure is produced by a pump driven directly or indirectly from the internal combustion engine, and which is fed by way of a line 20 to a first annular space 21 of the servo-motor 19. The servo-piston 22 which is connected by way of a lever 23 with a control rack 24 of an injection pump 25, forms together with the housing 26 of the servo-motor 19 a second annular space 27.

According to the present invention, an auxiliary piston 30 is arranged coaxially to the servo-piston 22 and to the control slide valve member 18, which is acted upon by the pressure of the working medium. An abutment 28 connected with the control slide valve member 18 thereby permits with an existing pressure of the working medium a stroke of the control slide valve member 18 limited by the servo-piston 22 in the one direction and a stroke of the control piston limited by the auxiliary piston 30 in the other direction. A spring 31 is supported at the servo-piston 22, acts on the auxiliary piston 30 opposite the pressure of the working medium and clamps together the control slide valve member 18 and the servo-piston 22 by way of the abutment 28 and the auxiliary piston 30 when no pressure is present in the working medium.

Figure 2:
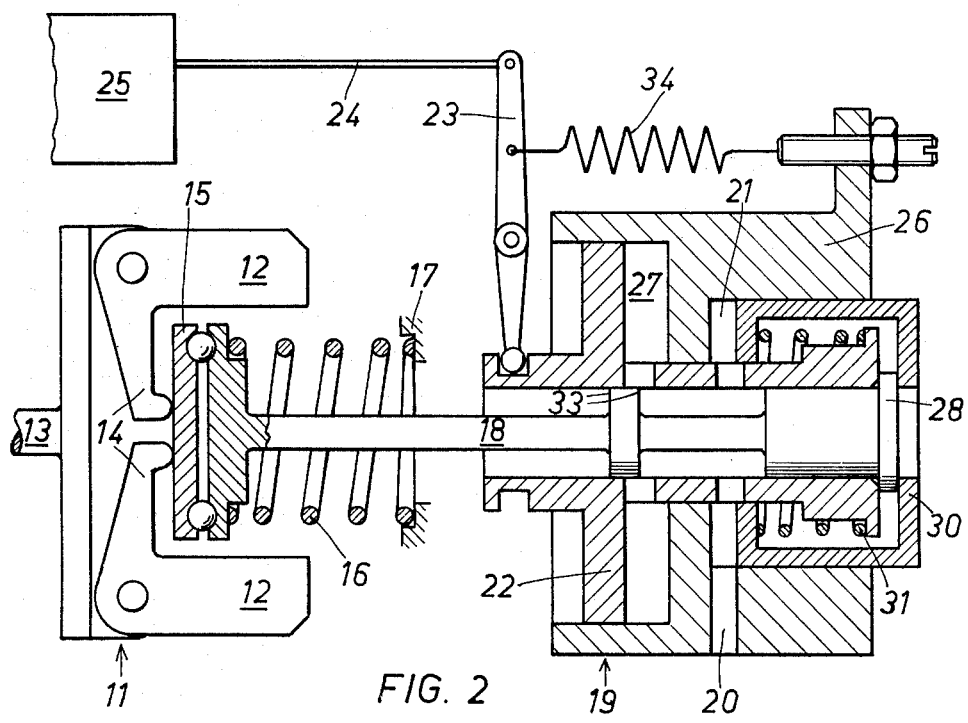
FIG. 2 is a somewhat schematic view, similar to FIG. 1, and illustrating the parts when the working medium is without pressure.
Figure 3:
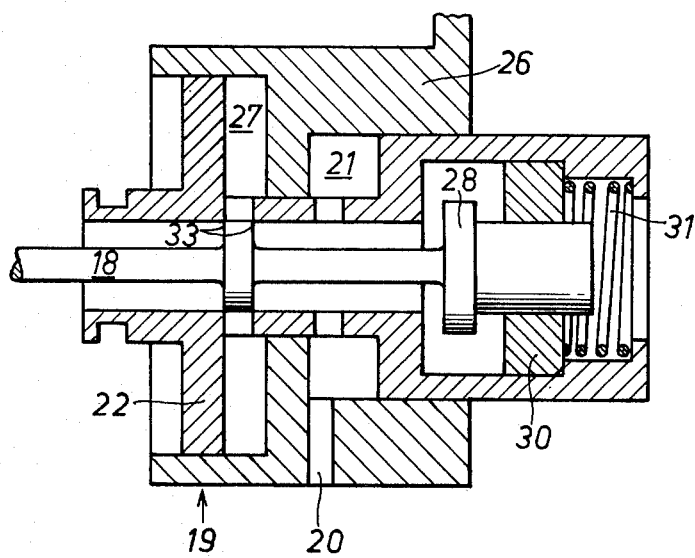
FIG. 3 is a partial cross-sectional view through another embodiment of a servo-motor in accordance with the present invention, illustrating the various parts in the position thereof when the working medium is under pressure.

Whereas in the embodiment of FIGS. 1 and 2, the auxiliary piston 30 is slidingly sealingly guided with respect to the servo-piston 22 and the servo-motor housing 26, FIG. 3 illustrates an embodiment in which the auxiliary piston 30, mounted on a piston spool projecting from the abutment 28, is slidingly sealingly guided with respect to the servo-piston 22 and the control slide valve member 18. However, the operation of the servo-motor of FIG. 3 is the same as that of FIG. 1.

OPERATION

If the working medium is under pressure (FIGS. 1 and 3), then the servo-piston 22 follows the movements of the control slide valve member 18. The servo-piston 22 is thereby displaced in one direction under the effect of the pressure of the working medium in the first annular space 21 and in the other direction under the additional effect of the pressure in the second annular space 27 because the effective piston area of the servo-piston 22 in the second annular space 27 is considerably larger than the end face area effective for the piston displacement in the first annular space 21, whereby the control edges 33 of the control slide valve member 18 control the in-flow of the working medium into the second annular space 27 or the relief of this second annular space 27.

In the case of a lacking pressure of the working medium (FIG. 2), the control slide valve member 18 and the servo-piston 22 are clamped together under the effect of the spring 31 with the aid of the auxiliary piston 30 so that the control slide valve member 18, the servo-piston 22, the lever 23 and the control rack 24 are adjusted in unison by the sleeve 15 of the centrifugal governor 11.

Even though the degree of insensitivity of the control system is increased thereby, i.e., a larger change of the rotational speed has to take place as a result of the friction in the linkage and the adjusting work in the injection pump until the sleeve 15 is set into movement, an emergency operation of the internal combustion engine is possible nonetheless over the entire rotational speed range in case of an absent pressure of the working medium and the internal combustion engine can be started without the customary pre-oil pump pressure.

An adjustable auxiliary spring 34 provided in addition to the control spring 16, which engages at the lever 23 and whose action is of significance only during the operation without pressure in the working medium, equalizes the displacement between the servo-piston 22 and the control slide valve member 18 resulting from the clamping together of the control slide valve member and the servo-piston and therewith compensates for the unstressing of the control spring 16 connected therewith and enables as a result thereof that with the same position of the spring abutment 17 and with the same rotational speed of the internal combustion engine, the same filling is adjusted at the injection pump during operation with and without pressure in the working medium.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim

1. A hydraulic servo-motor for the control of an internal combustion engine which comprises a servo-piston means adapted to be operatively connected with a fuel quantity control means of the internal combustion engine, control slide valve means adapted to be operatively connected with a centrifugal governor means of the internal combustion engine, and pump means providing a working medium under pressure, characterized by an auxiliary piston means which is acted upon by the pressure of the working medium and which is operable to enable with an existing pressure of the working medium, a stroke of the control slide valve means in one direction limited by the servo-piston means and a stroke thereof in the other direction limited by the auxiliary piston means, and spring means supported at the servo-piston means and acting on the auxiliary piston means opposite the pressure of the working medium, said spring means being operable to effectively clamp together the control slide valve means and the servo-piston means by way of the auxiliary piston means when no pressure is present in the working medium.

2. A hydraulic servo-motor according to claim 1, characterized in that the control slide valve means is coaxially arranged to the servo-piston means.

3. A hydraulic servo-motor according to claim 1, characterized in that the auxiliary piston means is coaxially arranged to the servo-piston means and the control slide valve means.

4. A hydraulic servo-motor according to claim 3, characterized in that the auxiliary piston means is provided with an abutment means connected thereto and in that in case of a non-existent pressure in the working medium said spring means clamps together the control slide valve means and the servo-piston means by way of the abutment and the auxiliary piston means.

5. A hydraulic servo-motor with a housing according to claim 4, characterized in that the auxiliary piston means is slidingly sealingly guided with respect to the servo-piston means and the servo-motor housing.

6. A hydraulic servo-motor according to claim 4, characterized in that the auxiliary piston means is slidingly sealingly guided with respect to the servo-piston means and the control slide valve means.

7. A hydraulic servo-motor according to claim 4, characterized in that a spring means engages at a control linkage between the servo-motor and the fuel quantity control means which in case of a lacking pressure in the working medium of the servo-motor acts as auxiliary spring in addition to the control spring means.

8. A servo-motor according to claim 7, characterized in that said auxiliary spring is adjustable.

9. A hydraulic servo-motor with a housing according to claim 1, characterized in that the auxiliary piston means is slidingly sealingly guided with respect to the servo-piston means and the servo-motor housing.

10. A hydraulic servo-motor according to claim 1, characterized in that the auxiliary piston means is slidingly sealingly guided with respect to the servo-piston means and the control slide valve means.

11. A hydraulic servo-motor according to claim 1, characterized in that a spring means engages at a control linkage between the servo-motor and the fuel quantity control means which in case of a lacking pressure in the working medium of the servo-motor acts as auxiliary spring in addition to the control spring means.

12. A hydraulic servo-motor according to claim 1, characterized in that the auxiliary piston means is provided with an abutment means connected thereto and in that in case of a non-existent pressure in the working medium said spring means clamps together the control slide valve means and the servo-piston means by way of the abutment means and the auxiliary piston means.

13. A hydraulic servo-motor for the control of an internal combustion engine comprising servo-motor housing means for receiving a working medium under pressure, servo-piston means movable with respect to the servo-motor housing means and adapted for controlling a fuel quantity control means of the internal combustion engine, control slide valve means movable with respect to the servo-motor housing means in accordance with at least an output of a centrifugal governor means of the internal combustion engine, an auxiliary piston means movable with respect to the servo-motor housing means and being arranged to be acted upon by the pressure of the working medium, the auxiliary piston means being operable to enable with an existing pressure of the working medium a stroke of the control slide valve means in one direction limited by the servo-piston means and a stroke thereof in the other direction limited by the auxiliary piston means, and spring means supported at the servo-piston means and acting on the auxiliary piston means in opposition to the pressure of the working medium, the spring means being operable to effectively clamp together the control slide valve means and the servo-piston means by way of the auxiliary piston means when no pressure is present in the working medium.

14. A hydraulic servo-motor according to claim 13, characterized in that the control slide valve means, the servo-piston means and the auxiliary piston means when clamped together by the spring means move together in unison with respect to the servo-motor housing means.

15. A hydraulic servo-motor according to claim 14, characterized in that the servo-piston means is directly responsive to the movement of the control slide valve means in accordance with the output of the centrifugal governor means when no pressure is present in the working medium for controlling the fuel quantity control means.

16. A hydraulic servo-motor according to claim 13, characterized in that the servo-piston means, the control slide valve means and the auxiliary piston means are capable of movement with respect to each other with an existing pressure of the working medium.

* * * * *